United States Patent
Massot et al.

(10) Patent No.: US 10,605,106 B2
(45) Date of Patent: Mar. 31, 2020

(54) TURBINE OF GAS TURBINE ENGINE, COMPRISING A LABYRINTH SEAL ELEMENT

(71) Applicant: SAFRAN AIRCRAFT ENGINES, Paris (FR)

(72) Inventors: Aurélien René-Pierre Massot, Moissy-Cramayel (FR); Eric Schwartz, Moissy-Cramayel (FR); Wilfried Lionel Schweblen, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 72 days.

(21) Appl. No.: 15/755,991

(22) PCT Filed: Sep. 2, 2016

(86) PCT No.: PCT/FR2016/052171
§ 371 (c)(1),
(2) Date: Feb. 27, 2018

(87) PCT Pub. No.: WO2017/037394
PCT Pub. Date: Mar. 9, 2017

(65) Prior Publication Data
US 2018/0252114 A1    Sep. 6, 2018

(30) Foreign Application Priority Data
Sep. 2, 2015  (FR) ..................................... 15 58118

(51) Int. Cl.
*F01D 11/12*    (2006.01)
*F16J 15/44*    (2006.01)
(Continued)

(52) U.S. Cl.
CPC ............ *F01D 11/122* (2013.01); *F01D 11/02* (2013.01); *F02C 7/28* (2013.01); *F16J 15/445* (2013.01);
(Continued)

(58) Field of Classification Search
CPC ...... F01D 11/122; F01D 11/125; F01D 11/12; F01D 11/08; F01D 11/127; F01D 11/02
See application file for complete search history.

(56) References Cited

U.S. PATENT DOCUMENTS

| | | | |
|---|---|---|---|
| 8,105,021 B2 * | 1/2012 | Glahn | .................. F01D 11/001 415/168.2 |
| 2008/0274336 A1 | 11/2008 | Merrill et al. | |
| 2016/0305266 A1 * | 10/2016 | Zywiak | ................. F01D 11/001 |

FOREIGN PATENT DOCUMENTS

| | | |
|---|---|---|
| EP | 1780380 A2 | 5/2007 |
| EP | 2196632 A2 | 6/2010 |

(Continued)

OTHER PUBLICATIONS

Written Opinion of the International Searching Authority dated Nov. 17, 2016, issued in corresponding International Application No. PCT/FR2016/052171, filed Sep. 2, 2016, 6 pages.
(Continued)

*Primary Examiner* — Richard A Edgar
(74) *Attorney, Agent, or Firm* — Christensen O'Connor Johnson Kindness PLLC

(57) ABSTRACT

A turbine of a gas turbine engine comprising a stator sealing ring element arranged so as to form a labyrinth sealing joint in combination with at least one wiper, rotatable about the axis of the sealing ring. The element includes an abradable material layer with a surface portion engageable with said movable wiper. The abradable material layer on the surface portion axially includes a first area having a first wiper penetration resistance, said first area corresponding to the
(Continued)

axial position of the wiper during nominal operation of the turbine, and a second area adjacent to the first area and having lower wiper penetration resistance than the first area. The second area is located downstream from the first area and corresponds to the axial position that the wiper takes when a flame goes out in the combustion chamber of the engine.

11 Claims, 3 Drawing Sheets

(51) Int. Cl.
   *F16J 15/447*   (2006.01)
   *F01D 11/02*   (2006.01)
   *F02C 7/28*    (2006.01)
(52) U.S. Cl.
   CPC ....... *F16J 15/4472* (2013.01); *F05D 2220/32* (2013.01); *F05D 2240/11* (2013.01); *F05D 2240/55* (2013.01)

(56) References Cited

FOREIGN PATENT DOCUMENTS

| EP | 2613008 A1 | 7/2013 |
| WO | 98/26158 A1 | 6/1998 |

OTHER PUBLICATIONS

International Preliminary Report on Patentability dated Mar. 6, 2018, issued in corresponding International Application No. PCT/FR2016/052171, filed Sep. 2, 2016, 1 page.

International Search Report dated Nov. 17, 2016, issued in corresponding International Application No. PCT/FR2016/052171, filed Sep. 2, 2016, 3 pages.

Written Opinion of the International Searching Authority dated Nov. 17, 2016, issued in corresponding International Application No. PCT/FR2016/052171, filed Sep. 2, 2016, 5 pages.

* cited by examiner

ND A LABYRINTH SEAL
TURBINE OF GAS TURBINE ENGINE, COMPRISING A LABYRINTH SEAL ELEMENT

TECHNICAL FIELD

Embodiments of the present disclosure relate to the field of gas turbine engines and more particularly to the field of stator seal elements used in the labyrinth seal between the moving and stationary parts of a turbine.

BACKGROUND

A gas turbine engine comprises, at the level of the turbine for example, seals between the outer radial ends of the rotor blades and the stator surface swept by the outer radial ends of the moving stage; it is a matter of preventing a portion of the driving gas not working by bypassing the turbine stage. Labyrinth seals are used for this purpose. These seals comprise a seal element integral with the rotor, formed from one or more strips, called wipers, arranged radially and transversely relative to the rotation axis of the machine. They also comprise a complementary stator element, facing the strips. This element has a surface portion that interacts with the strips to provide clearance that is as small as possible. Several strips in parallel cause a succession of pressure losses of the gas stream flowing round the turbine stage, providing the desired sealing.

These labyrinth seals are used in several places of the engine, for example also between the turbine shaft and the base of the stator stage, formed from stator vanes, between two successive moving stages of a turbine.

Depending on their operating conditions, gas turbine engines are subject to differential variations in expansion between in particular the elements of the stator and those of the rotor. If these differences in variation are not kept under control they may affect the clearances between the moving parts and the stationary parts. Thus, for an engine for propulsion of an aircraft undergoing flame extinction in the combustion chamber in flight for any reason, the whole turbine cools down because high-temperature gases are no longer passing through it. However, the casing may be cooled more quickly than the turbine rotor, which has an effect on the clearances. Now, for optimum efficiency, the clearances of the labyrinth seals are designed to be as small as possible in operation. In such a situation there is a consequent risk of blocking of the rotor owing to the more or less close contact of the wipers with the abradable material.

The characteristics of the labyrinth seal are determined and adjusted to allow a variation of clearance and possible slight contact during the different phases of flight, in normal operation, but when the dimensional variations are large, resulting from an incident of this kind, the labyrinth seal can no longer fulfil its role. As the rotor is prevented from turning, restarting of the engine by autorotation of the LP or HP body or else by being driven by an auxiliary engine may not proceed satisfactorily.

To prevent rotor lock-up in the case of such extinction of the combustion chamber, it would be conceivable to increase the clearance between the wipers and the abradable material. However, this solution is not economically viable owing to the drop in engine performance that it would cause.

The present applicant therefore pursued the aim of developing a solution that would make it possible to cope with the situation of untimely extinction of the combustion chamber without reducing the performance of the engine in normal operation.

SUMMARY

This aim is achieved according to the disclosure with a turbine of a gas turbine engine, comprising a stator sealing ring element arranged to form a labyrinth seal in conjunction with at least one wiper rotatable around the axis of the sealing ring, the element comprising a layer of abradable material with a sealing surface portion able to interact with the moving wiper.

In the turbine according to the disclosure, the layer of abradable material on the surface portion comprises, axially, a first zone with a first resistance to penetration of a wiper, the first zone corresponding to the axial position of the wiper in nominal operation of the turbine, and a second zone adjacent to the first zone with reduced resistance to penetration of a wiper relative to the first zone, the second zone being located downstream relative to the first zone and corresponding to the axial position that the wiper assumes when flame extinction occurs in the combustion chamber of the engine.

The abradable material is a material that is worn or deformed in contact with the rotating wiper, preferably the latter. It may be a honeycomb material.

The sealing ring element may be a sealing ring sector or a whole ring.

The disclosure results from the observation that in flight, when the engine is no longer driven by the engine gases, it goes into autorotation and is subjected to the pressure of the relative wind. Moreover, in flight and when the engine is no longer driven, the differences in axial and radial expansion between the casing and the rotor may cause blocking of the rotor. This blocking may moreover be promoted by the slight downstream displacement of the various bodies, LP and HP, resulting from the aforementioned pressure of the relative wind. The disclosure takes advantage of this displacement to reserve two zones on the surface portion opposite the wiper. The first zone corresponds to the axial position of the wiper in normal operation of the machine; the clearance between the wiper and the abradable material is in this case that of optimum operation of the machine. The second zone is located downstream relative to the first and corresponds to the axial position that the wiper assumes when flame extinction occurs in the combustion chamber. As the clearance will then decrease until it is negative, it is important to reduce the frictional forces between the two parts moving relative to one another. This reduces or even eliminates the risks of rotor lock-up resulting from this contact.

Thus, the at least one moving wiper is able to move between two axial positions, a first position corresponding to normal (nominal) operation of the turbine, and a second position, downstream of the first position, corresponding to the axial position that the wiper assumes when flame extinction occurs in the combustion chamber. The layer of abradable material is configured to comprise, axially, the first zone, on which the wiper will be positioned when it is in its first axial position, and the second zone, on which the wiper will be positioned when it is in its second axial position.

The second zone may comprise at least one cavity. The presence of this cavity leads to reduced resistance to penetration of the wiper relative to the first zone. The at least one cavity may be arranged in the thickness of the layer of abradable material and/or open onto the outside (axially and/or radially) of the layer of abradable material.

According to a first embodiment, the surface portion of the turbine stator sealing element has, relative to the axis (A) of the engine, a constant radius along the two zones, and in the second zone adjacent to the first, the thickness of the abradable layer is reduced. This zone with reduced thickness gives way to the lock-up pressure and releases the wipers from the frictional forces. Rotor lock-up is avoided.

According to a particular embodiment, the thickness of the abradable layer in the second zone is reduced to 50-95% of the thickness of the abradable layer in the first zone. Advantageously, the zone with reduced thickness is filled with a material with resistance lower than that of the abradable material.

According to another embodiment, the surface portion is cylindrical along the first zone and truncated along the second zone.

The disclosure finds a first application in which the element is arranged to form a labyrinth seal at the outer radial end of the rotor blades of a turbine, in particular axial.

The disclosure finds another application in which the element is arranged to form a labyrinth seal at the inner radial end of the stator blades of a turbine.

In one embodiment, the turbine comprises a rotor and a stator, the rotor comprising a plurality of radial blades provided at their radially outer end with a rotor sealing element with at least one wiper in the form of a radial strip, oriented radially outwards (it may be perpendicular to the axis or inclined relative to the axis, for example upstream) relative to the rotation axis (A) of the rotor, the stator forming the cylindrical envelope within which the rotor blades are set in motion, the stator comprising, opposite the strip, a stator sealing element made of an abradable material and forming a labyrinth seal with the rotor sealing element. The stator sealing element forms a sealing ring, the first zone corresponding to nominal operation of the turbine and the second zone corresponding to operation in the phase of re-ignition after extinction of the engine's combustion chamber.

In one embodiment, the turbine comprises a stage formed from stator fins, the fins comprising, on the side of the axis (A) of the turbine, a sealing element interacting with at least one rotatable wiper to form a labyrinth seal. In the sealing element, the first zone corresponds to nominal operation of the turbine and the second zone corresponds to operation in the phase of re-ignition after extinction of the combustion chamber.

The disclosure also relates to a gas turbine engine comprising a turbine described above. It also relates to a turbine aero-engine comprising a gas turbine engine of this kind.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
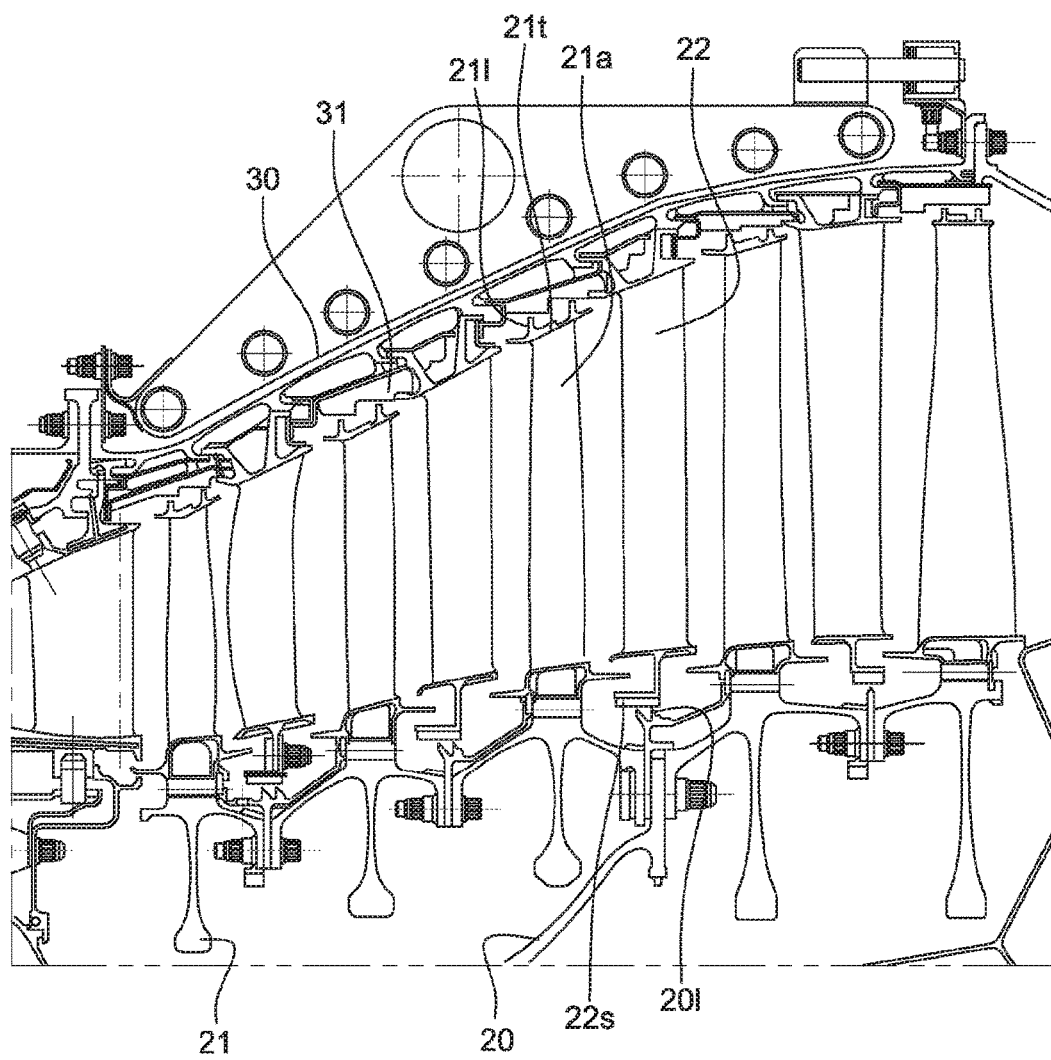
FIG. 1 is a schematic representation, in partial axial section, of an example of turbine of a gas turbine engine to which the disclosure applies.

FIG. 1 shows the LP turbine of a gas turbine engine. The structure of this turbine is known per se.

This turbine 1 in this case has four stages. In this example, the rotor 20 of the turbine is formed from four turbine disks 21 bolted together. Each disk 21 carries rotor blades 21a on its rim. At their outer radial end the blades have a root 21t, which is provided with radial strips 211, facing the stator 30. In the example in the figure, each root 21t supports two radial strips forming the wipers of labyrinth seals. Opposite the wipers, the stator comprises sealing elements 31, which, as is known per se, form labyrinth seals with the wipers on the roots. According to this example, the two labyrinth seals are at two different radii relative to the axis (A) of the machine.

There are also labyrinth seals on the inner radial end of the wheels of interstage stator blades 22. The stator sealing element 22s is for example a ring in two halves. The wipers 201 are carried by the lateral extensions of the turbine disks 21 joining the latter by bolting.

Figure 2:
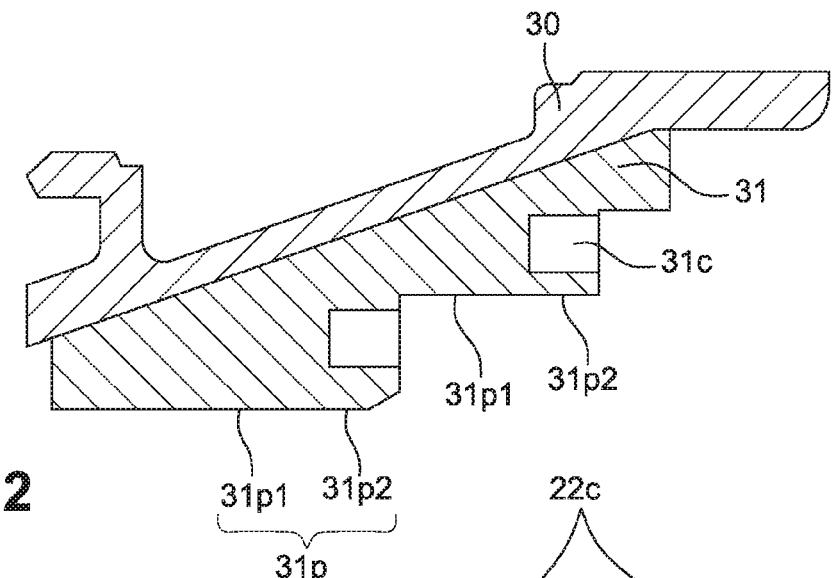
FIG. 2 shows a detail from FIG. 1 relating to a stator sealing element to which the disclosure applies.

Embodiments of the disclosure will now be described with reference to FIGS. 2 to 6. FIG. 2 shows a detail of one of the stator sealing elements 31. This element 31 is an annular sector; in this example it comprises two surface portions 31p, each arranged to interact with a wiper 211 of the root 21t of the blade of the stage under consideration. Each surface portion 31p comprises a first zone 31p1 and a second zone 31p2. The first zone 31p1 is upstream of the zone 31p2 and interacts with a wiper 211 of the root 21t. This first zone 31p1 corresponds to the axial position of the wiper 211 in normal operation of the machine. The clearance between the wiper 211 and the abradable layer of the sealing element 31 is controlled. In normal operation of the gas turbine engine, the labyrinth seal is not subject to any appreciable deterioration, the temperature differences are controlled, and the differences in expansion between the moving parts and the stator parts do not affect the surface of the abradable material.

In the second zone 31p2, located downstream of the first zone, the abradable layer is of reduced thickness. A cavity 31c is made in the material to weaken it. On an existing sealing element the reduction may consist of machining into the thickness of the layer covering the sealing element; this zone corresponds to the axial position of the wiper during extreme operation of the engine in which the combustion chamber is extinguished in flight; the rotor is liable to be gripped by the stator element. In fact, when the combustion chamber is extinguished for an undesirable reason, the engine gases no longer pass through the rotors and the latter are subjected to the pressure of the air coming into the engine. In this situation, the rotors undergo a downstream axial displacement. Owing to the differential cooling between the rotor and the stator, if the stator is cooled rapidly and contracts, the ends of the wipers penetrate into the material, which is weakened by the cavity 31c. No risk of blocking of the rotor is then to be feared from the solution of the disclosure as appropriate materials are used.

Figure 4:
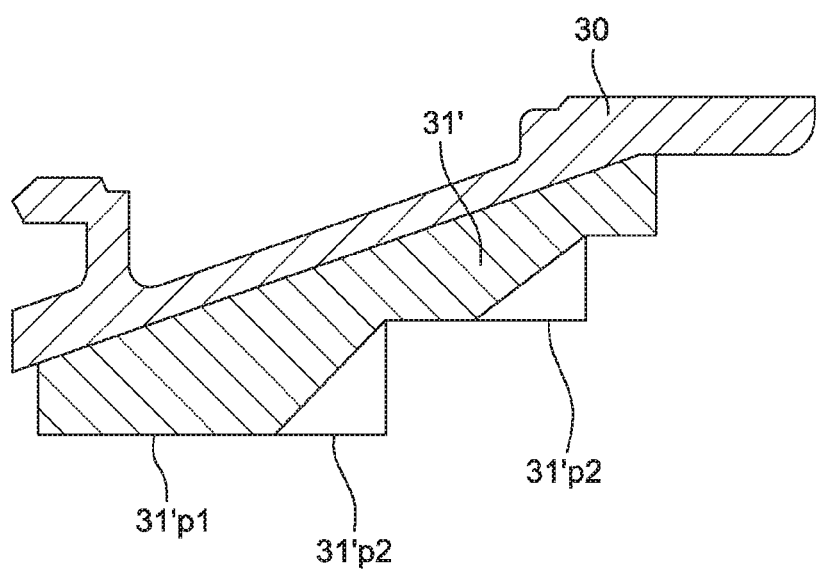
FIG. 4 shows another embodiment of the disclosure.

The solution in FIG. 4 relates to a variant. The sealing element 31' has, on the surface portion 31'p opposite the wipers, two zones 31'p1 and 31'p2. The solution consisted of beveling the second zone of the surface portion affected by the seal.

Figure 3:
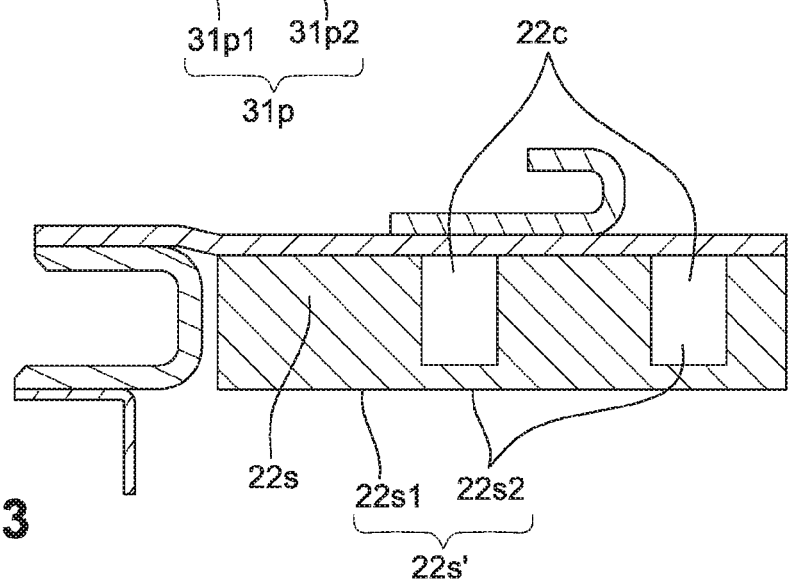
FIG. 3 shows a detail from FIG. 1 relating to another stator sealing element to which the disclosure applies.

FIG. 3 shows application of the disclosure to the seal between the inner radial end 22s of the interstage stator disk. On this element, cavities 22c have been machined in the abradable material so as to create, on the second zone, a low resistance to penetration by the corresponding wiper 201.

Figure 5:
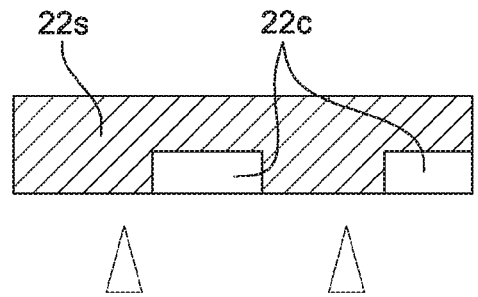
FIG. 5 shows a variant embodiment of the concept of FIG. 3.

FIG. 5 is a variant embodiment of the concept in FIG. 3, in which the cavities 22c, rather than being located at the outer periphery of the sealing element, are located at the inner periphery of this element and open out radially inwards.

Figure 6:
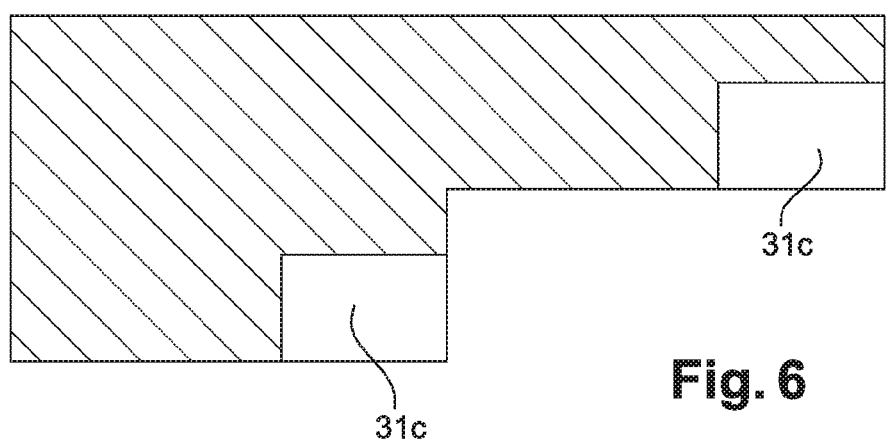
FIG. 6 shows a variant embodiment of the concept of FIG. 2.

FIG. 6 is a variant embodiment of the concept in FIG. 2, in which the cavities 31c, rather than opening out axially downstream, in this case open out radially inwards.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A turbine of a gas turbine engine, comprising a stator sealing ring element arranged to form a labyrinth seal in conjunction with at least one wiper rotatable around the axis of the sealing ring, said stator sealing ring element comprising a layer of abradable material with a sealing surface portion capable of interacting with said moving wiper wherein the layer of abradable material on said sealing surface portion comprises axially a first zone with a first resistance to penetration of a wiper, said first zone corresponding to the axial position of the wiper in nominal operation of the turbine, and a second zone adjacent to the first zone with a reduced resistance to penetration of a wiper relative to the first zone, said second zone being located downstream relative to the first zone and corresponding to the axial position that the wiper assumes when flame extinction occurs in the combustion chamber of the engine, wherein the radius of said sealing surface portion is constant along the two zones, and wherein in said second zone, adjacent to the first zone, the thickness of the abradable layer is reduced relative to the first zone.

2. The turbine according to claim 1, wherein said second zone comprises at least one cavity.

3. The turbine according to claim 2, wherein said cavities extend radially outwardly from the sealing surface portion.

4. The turbine according to claim 1, wherein the thickness of the abradable layer in the second zone is reduced to 50-95% of the thickness in the first zone.

5. The turbine according to claim 4, wherein the second zone with reduced thickness is filled with a material of lower resistance.

6. The turbine according to claim 1, wherein the stator sealing ring element is arranged to form a labyrinth seal at the outer radial ends of rotor blades of the turbine.

7. The turbine according to claim 1, wherein the stator sealing ring element is arranged to form a labyrinth seal at the inner radial ends of stator blades of the turbine.

8. The turbine according to claim 1, further comprising a rotor and a stator, said rotor comprising a plurality of radial blades provided at their radially outer end with a rotor sealing element with at least one wiper in the form of a radial strip, oriented radially outwards relative to the rotation axis of the rotor, said stator forming the cylindrical envelope within which the rotor blades are set in motion, the stator comprising, opposite said strip, the stator sealing ring element that forms a labyrinth seal with the rotor sealing element, wherein said first zone corresponding to nominal operation of the turbine and said second zone corresponding to operation in the phase of re-ignition after extinction of the engine's combustion chamber.

9. The turbine according to claim 1, comprising a stage formed from stator fins, said fins comprising, on the side of the axis of the turbine, the stator sealing ring element interacting with at least one rotatable wiper to form a labyrinth seal, wherein said first zone corresponding to nominal operation of the turbine and said second zone corresponding to operation in the phase of re-ignition after extinction of the engine's combustion chamber.

10. A gas turbine engine, comprising a turbine according to claim 1.

11. A turbine aero-engine, comprising a gas turbine engine according to claim 10.

* * * * *